(No Model.)

A. APPLEBY.
DRIVE CHAIN FOR CYCLES.

No. 586,472. Patented July 13, 1897.

Witnesses
Geo Avery
A B Biddle

Inventor
Alfred Appleby

UNITED STATES PATENT OFFICE.

ALFRED APPLEBY, OF BIRMINGHAM, ENGLAND.

DRIVE-CHAIN FOR CYCLES.

SPECIFICATION forming part of Letters Patent No. 586,472, dated July 13, 1897.

Application filed November 21, 1896. Serial No. 613,005. (No model.)

*To all whom it may concern:*

Be it known that I, ALFRED APPLEBY, a subject of the Queen of Great Britain, residing at Birmingham, in the county of Warwick and Kingdom of England, have invented certain new and useful Improvements in Drive-Chains for Cycles, of which the following is a specification.

This invention relates to improvements in drive-chains for cycles and other chain-geared vehicles and machines, and has for its object a simple and effective joining-up or connecting means whereby the respective links at the free ends of a length of drive-chain are linked together and an endless drive-chain formed.

My invention is also such that the joining-up links of the endless chain can be separated or detached at any time in a very simple and expeditious manner. The said joining-up means consists of a metallic thin plate, constituting a spring jaw or jaws having a gate or entrance allowing of the passage therethrough of the end of a joining-up pin or bolt, as hereinafter described. This thin metallic jaw-like plate is made of any suitable shape and is attached to the outside face of one of the side plates of the joining-up link of the drive-chain, and the gate or entrance in the said jaw or jaws is adapted to come nearly coincident with the cross-holes in the links to receive the connection pin or bolt. This joining-up or connection pin or bolt is designed with one of its ends rounded, and inward of this end is formed a groove or neck adapted to receive the edge or edges of the spring jaw or jaws of the plate before described and prevent the withdrawal of the pin.

To more clearly illustrate my invention, I attach hereto a sheet of drawings, in which—

Figure 1:
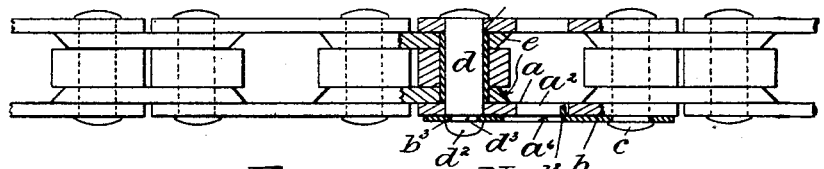
Figure 2:
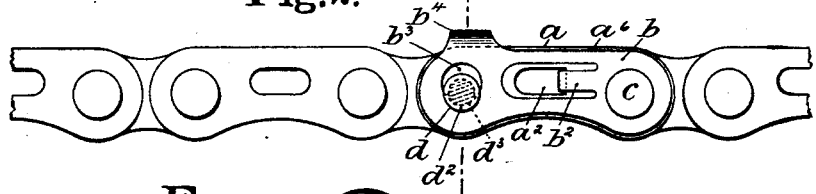
Figure 3:
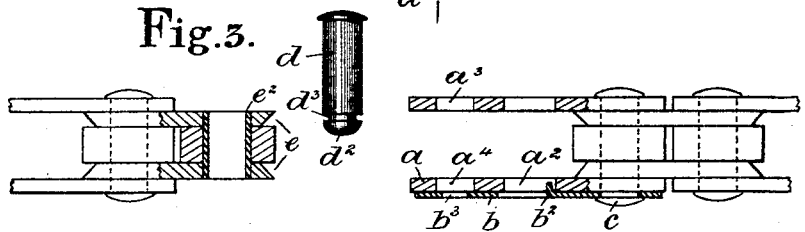
Figure 5:
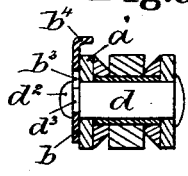
Figure 4:
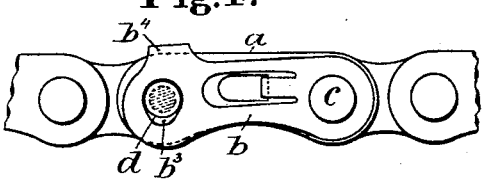

Figure 1 is an elevation, with a part broken in section, of a piece of drive-chain provided and fitted with joining-up means according to my invention. This figure shows the ends of the chain connected or joined up and the connection pin or rivet securely locked in its engaged position by a single spring-jaw. Fig. 2 represents a side elevation of Fig. 1, and this view and the previous one clearly illustrate the thin spring-steel jaw-like locking-plate and its parts, and also its connection and attachment to one of the outer joining-up links of a drive-chain. Fig. 3 sets forth a like view as Fig. 1, but with the respective ends of the drive-chain shown disconnected, while Fig. 4 is a side elevation illustrative of the position of the spring-jaw when the connecting pin or bolt is free to be withdrawn and the endless chain broken. Fig. 5 is a transverse section of Fig. 2, taken upon the dotted line X, and shows the locked position of the connecting pin or bolt.

The same letters of reference indicate corresponding parts in all the figures of the sheet of drawings.

The drive-chain is built up of pairs of inner and outer links connected together by cross pins or rivets, upon which are mounted antifriction-rollers. Upon the outside face $a^6$ of one of the outer links $a$ of the joining-up pair is attached, by being connected to a cross-rivet $c$, a thin steel jaw-like plate $b$ of a shape somewhat alike to the link to which it is attached. This thin steel plate $b$ is preferably stamped from a blank, and from the metal at the middle thereof is fashioned a spring-tongue or projection $b^2$, a hole or piercing $b^3$ and a thumb-piece $b^4$ being also provided within and upon the same for the purposes hereinafter described. The spring-tongue or projection $b^2$ takes into and engages with a slot or its equivalent $a^2$ within the side of the outer link $a$ and constitutes a spring-arm for keeping the jaw-like plate $b$ constantly in the position clearly shown in Fig. 2, while the hole or piercing $b^3$, which comes nearly coincident with the cross-holes in the links, forms a gate or entrance to the joining-up cross pin or bolt $d$, as hereinafter described, the said gate being brought coincident with the cross-holes when the bolt or pin is required to be withdrawn, and to accomplish this a thumb-piece $b^4$ is provided, upon which pressure can be exerted to force downward the said spring jaw-like plate, the position of which at this time is clearly shown in Fig. 4.

The joining-up pin $d$ is fashioned with one of its ends $d^2$ rounded and of the same diameter as the pin-body, and inward of this rounded part is a groove or neck $d^3$, with which the metal at the edge of the gate or entrance $b^3$ of the spring-plate $b$ is adapted to engage, and thereby hold the said joining-up pin in a locked position.

The inner joining-up links $e$ of the chain have cross-holes $e^2$ through them, (as also have the outer links, as before described,) and when the inner links are in position inside of the outer links the said holes, which are marked $e^2$, $a^3$, and $a^4$, become coincident, so that the joining-up bolt can be passed crosswise into them.

I wish it to be observed that the locking of the joining-up pin or bolt $d$ is automatic or self-acting, as when the said bolt is being forced home into the position shown in Figs. 1 and 2 the rounded end $d^2$ of the same presses downward the locking-plate $b$ until the gate $b^3$ admits of the passage of the said end. This pressing downward of the locking-plate deflects the spring-tongue $b^2$, and immediately the rounded end $d^2$ of the joining-up pin $d$ is through the gate $b^3$ the locking-plate snaps behind the said rounded end and into the groove or neck $d^3$ and securely prevents the withdrawal of the said bolt until pressure is exerted upon the thumb-piece $b^4$ to force down the locking-plate and bring the gate $b^3$ again coincident with the pin $d$.

Having fully described my invention, what I claim, and desire to secure by Letters Patent, is—

1. In a drive-chain, the combination with end links having perforations adapted to register with one another, of a pivot-pin arranged in said perforations and provided at one end with a contracted neck, a locking-plate pivoted at one end to one of said links and provided at its other end with a keyhole adapted to permit the passage therethrough of the end of the pivot-pin and also engage the said contracted neck, and a spring-tongue formed integral with said plate and engaging a corresponding slot formed in the link, said spring-tongue operating to normally hold the locking-plate in engagement with the said contracted neck, but permitting the locking-plate to yield laterally upon the insertion of the pivot-pin, substantially as described.

2. In a drive-chain, the combination with end links having perforations adapted to register with one another, of a pivot-pin arranged in said perforations and provided at one end with a rounded head and a contracted neck back of said head, a locking-plate pivoted at one end to one of said links and provided at its other end with a keyhole adapted to permit the passage therethrough of the end of the pivot-pin and also engage the said contracted neck, a spring-tongue struck up from said plate and engaging a corresponding slot formed in the link, said spring-tongue operating to normally hold the locking-plate in engagement with the said contracted neck, but permitting the locking-plate to yield laterally upon the insertion of the pivot-pin, and a thumb-piece formed on said locking-plate for throwing the latter out of engagement with the pivot-pin, substantially as described.

In testimony whereof I have signed my name to this specification in the presence of two subscribing witnesses.

ALFRED APPLEBY.

Witnesses:
A. F. BIDDLE,
FREDERICK BUCKLEY.